United States Patent
Khemani et al.

(10) Patent No.: US 9,734,093 B2
(45) Date of Patent: Aug. 15, 2017

(54) MANAGEMENT OF SECURED STORAGE DEVICES IN AN INFORMATION HANDLING SYSTEM

(71) Applicant: Dell Products, L.P., Round Rock, TX (US)

(72) Inventors: Lucky Pratap Khemani, Bangalore (IN); Anish K, Bangalore (IN)

(73) Assignee: Dell Products, L.P., Round Rock, TX (US)

(*) Notice: Subject to any disclaimer, the term of this patent is extended or adjusted under 35 U.S.C. 154(b) by 17 days.

(21) Appl. No.: 14/858,012

(22) Filed: Sep. 18, 2015

(65) Prior Publication Data

US 2017/0083457 A1  Mar. 23, 2017

(51) Int. Cl.
| | |
|---|---|
| G06F 11/30 | (2006.01) |
| G06F 15/177 | (2006.01) |
| G06F 9/00 | (2006.01) |
| G06F 1/26 | (2006.01) |
| G06F 12/14 | (2006.01) |
| H04L 9/32 | (2006.01) |

(52) U.S. Cl.
CPC ...... *G06F 12/1408* (2013.01); *G06F 12/1466* (2013.01); *H04L 9/32* (2013.01); *G06F 2212/1052* (2013.01)

(58) Field of Classification Search
CPC ............. G06F 12/1408; G06F 12/1466; G06F 2212/1052; H04L 9/32
USPC ........................ 713/182, 1, 100, 192; 726/34
See application file for complete search history.

(56) References Cited

U.S. PATENT DOCUMENTS

| | | | | |
|---|---|---|---|---|
| 2004/0255189 A1* | 12/2004 | Chu | ............... | G06F 11/2051 714/13 |
| 2004/0257998 A1* | 12/2004 | Chu | ............... | H04L 41/00 370/252 |
| 2007/0250363 A1* | 10/2007 | Boykin | ............... | G06F 9/542 705/40 |
| 2009/0287918 A1* | 11/2009 | Goldstein | ............... | G06F 9/4405 713/2 |
| 2010/0024001 A1* | 1/2010 | Campbell | ............... | G06F 21/85 726/2 |
| 2012/0331119 A1* | 12/2012 | Bose | ............... | H04L 61/6004 709/223 |
| 2013/0332605 A1* | 12/2013 | Kozlowski | ............... | G06F 9/5044 709/225 |
| 2013/0347103 A1* | 12/2013 | Veteikis | ............... | H04L 43/04 726/22 |
| 2015/0293953 A1* | 10/2015 | Wicks | ............... | G06F 17/30312 707/704 |
| 2016/0078212 A1* | 3/2016 | Bish | ............... | G06F 9/45558 713/189 |

* cited by examiner

*Primary Examiner* — Aravind Moorthy
(74) *Attorney, Agent, or Firm* — Fogarty LLP

(57) ABSTRACT

Systems and methods for managing secured storage devices in an Information Handling System (IHS) are described. In some embodiments, a Baseboard Management Controller (BMC) may have program instructions stored thereon that, upon execution, cause the BMC to: identify a triggering event; send an alert to a Chassis Management Controller (CMC); receive, from the CMC, a request for one or more security keys pair usable to authenticate one or more secured Solid State Drives (SSDs) in a new configuration different from a previous configuration; and provide a response to the CMC.

16 Claims, 4 Drawing Sheets

MANAGEMENT OF SECURED STORAGE DEVICES IN AN INFORMATION HANDLING SYSTEM

FIELD

This disclosure relates generally to computer systems, and more specifically, to systems and methods for managing secured storage devices in an Information Handling System.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In some cases, certain IHSs may be housed within a chassis. Generally speaking, a chassis is a rack or enclosure capable of providing shared power, cooling, networking, and/or management infrastructure to a plurality of IHSs, such as server blades, input/output (I/O) modules, storage devices, switches, etc. One or more devices, including one or more Hard Disk Drives (HDDs) or Solid State Drives (SSDs), may also be hosted by the chassis.

SUMMARY

Embodiments of systems and methods for managing secured storage devices in an Information Handling System (IHS) are described herein. In an illustrative, non-limiting embodiment, a Baseboard Management Controller (BMC) may have program instructions stored thereon that, upon execution, cause the BMC to: identify a triggering event; send an alert to a Chassis Management Controller (CMC); receive, from the CMC, a request for one or more security keys pair usable to authenticate one or more secured Solid State Drives (SSDs) in a new configuration different from a previous configuration; and provide a response to the CMC.

In some implementations, the triggering event may include a change in locking keys for the at least one secured SSD. Additionally or alternatively, the triggering event may include an IHS reboot. Additionally or alternatively, the triggering event may include a BMC reboot.

For example, the request may include a Web Services-Management (WSMAN) request and the response may include a WSMAN response. The response may include, for each secured SSD: an IHS identification, a slot identification, an SSD identification, and a security key pair. Moreover, the request may include a timeout value.

In the previous configuration a secured SSD may have been installed in a given slot of a given blade of a given chassis, and in the new configuration the secured SSD may be installed in a different slot of the given blade of the given chassis. Additionally or alternatively, in the previous configuration a secured SSD may have been installed in a given blade of a given chassis, and in the new configuration the secured SSD may be installed in a different blade of the given chassis. Additionally or alternatively, in the previous configuration a secured SSD may have been installed in a given blade of a given chassis, and in the new configuration the given blade may be installed in a new chassis. Additionally or alternatively, in the previous configuration a secured SSD may have been installed in a given blade of a given chassis, and in the new configuration the secured SSD may be installed in a different blade of a different chassis. In some cases, the CMC may be within the different chassis.

In another illustrative, non-limiting embodiment, a CMC having program instructions stored thereon that, upon execution, cause the CMC to: transmit to a BMC a request for a security key pair usable to authenticate a secured SSD in a new configuration different from a previous configuration; and receive a response from the BMC.

The request may be transmitted in response to a triggering event detected by the BMC, and the triggering event may include a change in locking keys for the at least one secured SSD or a BMC reboot. Additionally or alternatively, the request may be transmitted in response to a CMC reboot or switchover operation. The response may include, for each secured SSD installed in a chassis where the BMC resides: an IHS identification, a slot identification, an SSD identification, and a corresponding security key pair.

In various implementations: (a) in the previous configuration a secured SSD was installed in a given slot of a given blade of a given chassis, and in the new configuration the secured SSD is installed in a different slot of the given blade of the given chassis; (b) in the previous configuration a secured SSD was installed in a given blade of a given chassis, and in the new configuration the secured SSD is installed in a different blade of the given chassis; (c) in the previous configuration a secured SSD was installed in a given blade of a given chassis, and in the new configuration the given blade is installed in a new chassis; or (d) in the previous configuration a secured SSD was installed in a given blade of a given chassis, and in the new configuration the secured SSD is installed in a different blade of a different chassis.

In yet another illustrative, non-limiting embodiment, a method may include transmitting, from a CMC to a plurality of BMCs, a request for a security key pair usable to authenticate a secured SSD in a new configuration different from a previous configuration; receiving responses from the plurality of BMCs; and creating a database of security key pairs for a plurality of SSDs installed in a plurality of blades across a plurality of chassis.

Each of the responses may include, for each secured SSD, a chassis identification, an IHS identification, a slot identification, an SSD identification, and a security key pair.

The method may further include receiving a notification from a given BMC that a given SSD has been installed into a given slot of a given blade of a given one of the plurality of chassis; and in response to determining that the given SSD has a security key pair stored in the database, providing at least a portion of the security key pair to the given BMC sufficient for the given BMC to authenticate the given SSD.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 4 is a diagram showing an example of messages exchanged between a

Baseboard Management Controller (BMC) and a Chassis Management Controller (CMC) for managing secured devices according to some embodiments.

Figure 5:
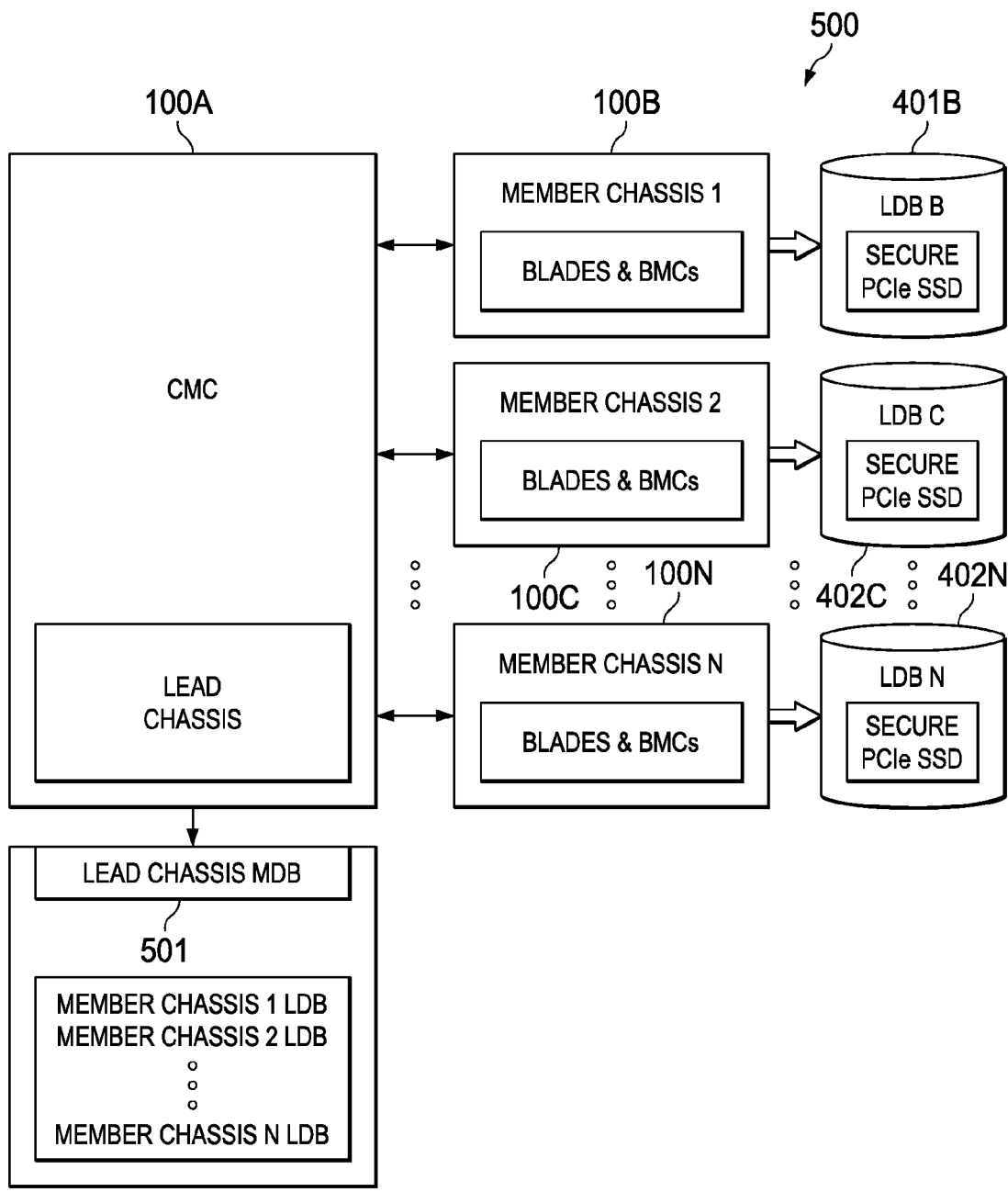

FIG. 5 is block diagram of an example of a system configured for managing secured storage devices across a plurality of chassis using a group manager feature according to some embodiments.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail in FIG. 3.

As described above, IHSs may be physically housed within a modular chassis system. Modular chassis or racks are physical enclosures capable of providing shared power, cooling, networking, and/or management infrastructure to a plurality of IHSs, such as server blades, input/output (I/O) modules, storage devices, switches, etc. Examples of storage devices include, but are not limited to, Hard Disk Drives (HDDs), Solid State Drives (SSD), etc. To allow each of these components to be added to and/or removed from the chassis, a carrier system may be used whereby each component is coupled to a device carrier, and the device carrier is then inserted into (and removable from) one of a plurality of slots of the chassis.

Figure 1:
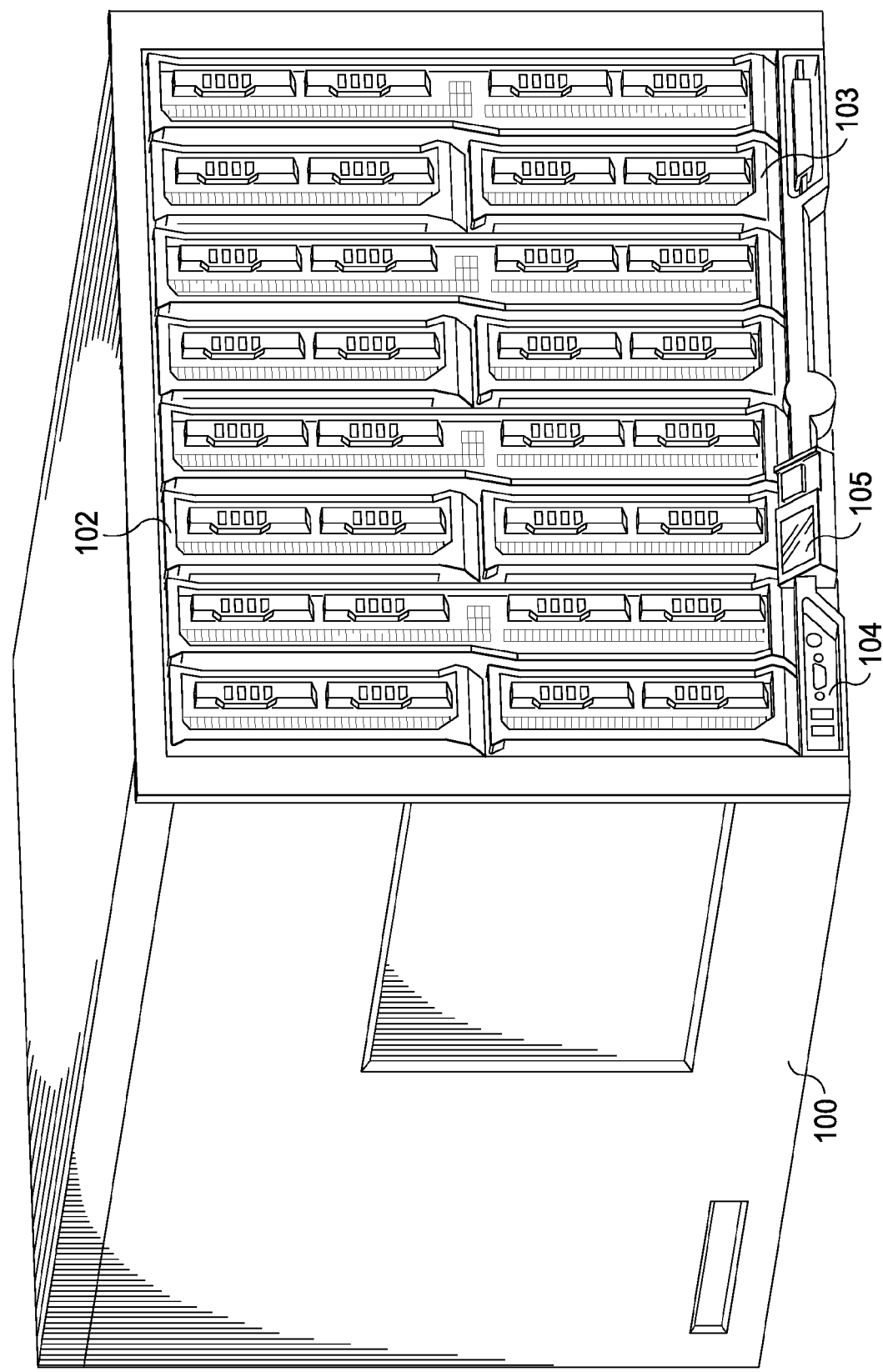
FIG. 1 shows a three-dimensional view of an example of a modular chassis according to some embodiments.

FIG. 1 shows a three-dimensional view illustrating the front end of an example of modular chassis 100 according to some embodiments. Chassis 100 is configured to house a plurality of components, including components 102 and 103, for example. In addition, chassis 100 may include display 105 and I/O connectors 104. Display 105 may provide certain status and configuration information regarding the chassis or its various components, whereas I/O connectors 104 may include ports and interfaces such as Universal Serial Bus (USB), audio, video, serial, parallel, Ethernet, etc. that enable a user to interact with the chassis.

Examples of components 102 and 103 that may be installed within chassis 100 include a plurality of IHSs, HDDs, SSDs, network devices, etc. Chassis 100 may also include a chipset or IHS referred to as a Chassis Management Controller (CMC), which is dedicated to enabling management for multiple-blade-server chassis and their servers, storage and networking devices within. In some embodiments, the CMC module may implement a secure browser-based interface that can be used to make a thorough system inventory, perform configuration and monitoring tasks, remotely power on/off servers, and enable alerts for component events in the system chassis. Again, the CMC is embedded into platform chassis 100, generally requires no additional software installation, and is also accessible from a front LCD panel 105.

Modular chassis 100 may also include a backplane or midplane (not shown) configured to perform internal connections between elements seen in the rear and the front ends of chassis 100. For example, in some cases, communication between the inserted components 102 and 103 and/or rear modules (not shown) may be performed via a vertical, passive backplane or midplane. The backplane or midplane may also include a printed circuit board (PCB) or the like with conductive traces (e.g., copper, etc.) effecting connections between the respective pins of corresponding connectors. For sake of simplicity, the terms "midplane" and "backplane" are used interchangeably herein.

In some implementations, the various components of FIG. 1 may be inserted or removed from chassis 100 while chassis 100 is running or turned on ("hot swapping"). In various configurations, chassis 100 may hold any number (e.g., 32, 64, etc.) of quarter-height device carriers, half-height device carriers, full-height device carriers, or any mix of them. It should be noted, however, that modular chassis 100 is described for sake of illustration only, and that many variations (e.g., number of components, distribution of components, etc.) may be present in other chassis.

Figure 2:
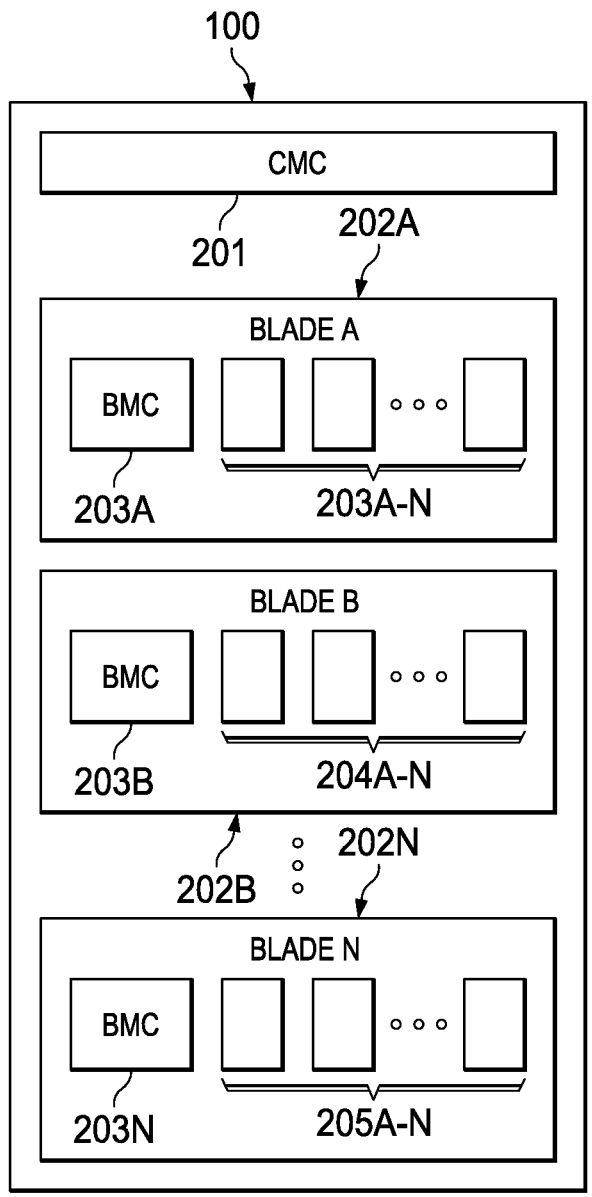
FIG. 2 is a block diagram of an example of a modular chassis according to some embodiments.

FIG. 2 is a block diagram of an example of a modular chassis according to some embodiments. As illustrated, chassis 100 includes CMC 201 and a plurality of servers or blades 202A-N, each representing one of components 102 and/or 103 or FIG. 1. Each of blades 202A-N may be a fully operational IHS having a corresponding baseboard management controller (BMC) 203A-N and a plurality of device slots 203A-N through 205A-N, some of which may be occupied with HDDs or SSDs. For example, one or more of slots 203A-N through 205A-N may include secured or self-encrypted SSDs. In other cases, slots 203A-N through 205A-N may be part of the chassis 100, and each HDD or SSD may be considered a component 102/103.

BMCs 203A-N are specialized service processors that monitor the physical state of a computer, network server or other hardware device using sensors and communicating with the system administrator through an independent connection. As a non-limiting example of a BMC, the integrated Dell Remote Access Controller (iDRAC) from Dell® is embedded within Dell PowerEdge™ servers and provides functionality that helps information technology (IT) administrators deploy, update, monitor, and maintain servers with no need for any additional software to be installed. The Dell iDRAC works regardless of operating system or hypervisor presence because from a pre-OS or bare-metal state, iDRAC is ready to work because it is embedded within each server from the factory.

The SSDs inserted into slots 203A-N through 205A-N may include self-encrypting SSDs, also referred to herein as Secured SSDs. Each Secured SSD has two types of keys: encryption keys (e.g., to support 256-bit AES hardware encryption or the like) and authentication keys. Encryption keys are not ordinarily exposed to components outside the drive, and generally require no administration. However, authentication keys (or locking keys) need some degree of system-level management support. Particularly with respect to Peripheral Component Interconnect Express (PCIe) SSDs, there is one security key pair per BMC (i.e., key identifier and passcode). The key pair may be escrowed into a file and securely placed on the BMC's non-volatile memory. In some implementations, the security key pair may be managed using a non-volatile memory (NVMe) Local Key Management (LKM) feature which supports creation, deletion, change, importing, etc. of SSD configuration features.

Figure 3:
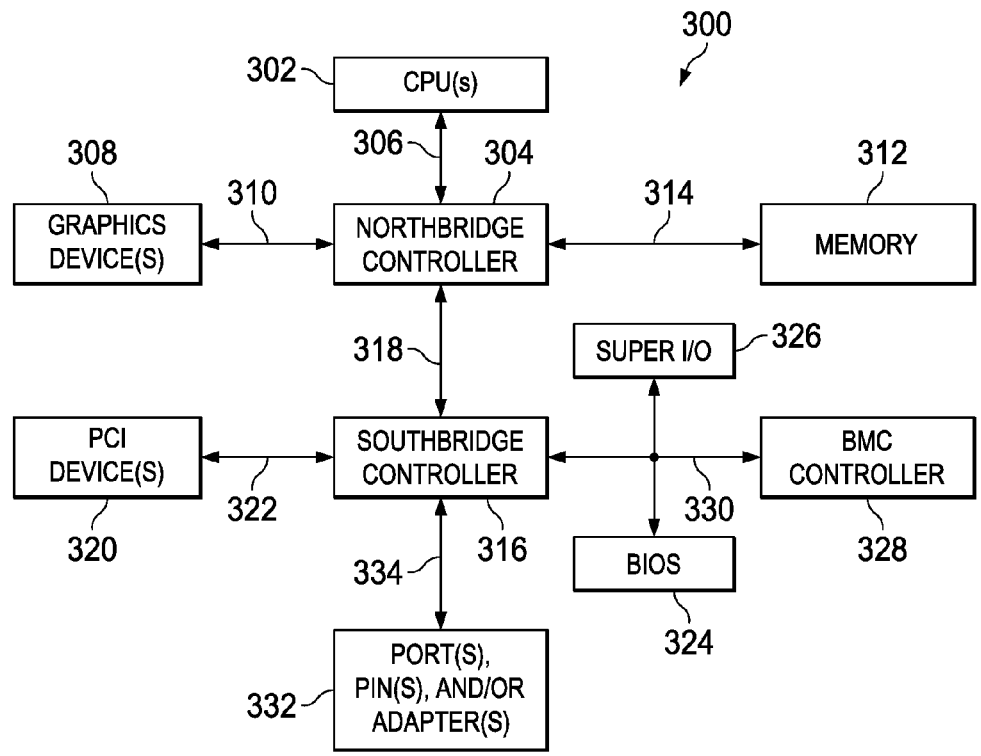
FIG. 3 is a block diagram of an example of an Information Handling System (IHS) according to some embodiments.

FIG. 3 is a block diagram an example of IHS 300 which may be used to implement CMC 201 and/or each of server blades 202A-N within chassis 100. As shown, computing device 300 includes one or more CPUs 302. In various embodiments, computing device 300 may be a single-processor system including one CPU 302, or a multi-processor system including two or more CPUs 302 (e.g., two, four, eight, or any other suitable number). CPU(s) 302 may include any processor capable of executing program instructions. For example, in various embodiments, CPU(s) 302 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of CPU(s) 302 may commonly, but not necessarily, implement the same ISA. In an embodiment, a motherboard (not shown) may be configured to provide structural support, power, and electrical connectivity between the various components illustrated in FIG. 3.

CPU(s) 302 are coupled to northbridge controller or chipset 304 via front-side bus 306. Northbridge controller 304 may be configured to coordinate I/O traffic between CPU(s) 302 and other components. For example, in this particular implementation, northbridge controller 304 is coupled to graphics device(s) 308 (e.g., one or more video cards or adaptors, etc.) via graphics bus 310 (e.g., an Accelerated Graphics Port or AGP bus, a Peripheral Component Interconnect or PCI bus, etc.). Northbridge controller 304 is also coupled to system memory 312 via memory bus 314. Memory 312 may be configured to store program instructions and/or data accessible by CPU(s) 302. In various embodiments, memory 312 may be implemented using any suitable memory technology, such as static RAM (SRAM), synchronous dynamic RAM (SDRAM), nonvolatile/Flash-type memory, or any other type of memory.

Northbridge controller 304 is coupled to southbridge controller or chipset 316 via internal bus 318. Generally, southbridge controller 316 may be configured to handle various of computing device 300's I/O operations, and it may provide interfaces such as, for instance, Universal Serial Bus (USB), audio, serial, parallel, Ethernet, etc., via port(s), pin(s), and/or adapter(s) 332 over bus 334. For example, southbridge controller 316 may be configured to allow data to be exchanged between computing device 300 and other devices, such as other IHSs attached to a network. In various embodiments, southbridge controller 316 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 316 may also enable connection to one or more keyboards, keypads, touch screens, scanning devices, voice or optical recognition devices, or any other devices suitable for entering or retrieving data. Multiple I/O devices may be present in computing device 300. In some embodiments, I/O devices may be separate from computing device 300 and may interact with computing device 300 through a wired or wireless connection. As shown, southbridge controller 316 is further coupled to one or more PCI devices 320 (e.g., modems, network cards, sound cards, video cards, etc.) via PCI bus 322. Southbridge controller 316 is also coupled to Basic I/O System (BIOS) 324, Super I/O Controller 326, and Baseboard Management Controller (BMC) 328 via Low Pin Count (LPC) bus 330.

BIOS 324 includes non-volatile memory having program instructions stored thereon. Those instructions may be usable CPU(s) 302 to initialize and test other hardware components and/or to load an Operating System (OS) onto computing device 300. As such, BIOS 324 may include a firmware interface that allows CPU(s) 302 to load and execute certain firmware, as described in more detail below. In some cases, such firmware may include program code that is compatible with the Unified Extensible Firmware Interface (UEFI) specification, although other types of firmware may be used.

BMC controller 328 may implement any one of BMCs 203 in FIG. 2, and it may include non-volatile memory having program instructions stored thereon that are usable by CPU(s) 302 to enable remote management of computing device 300. For example, BMC controller 328 may enable a user to discover, configure, and manage BMC controller 328, setup configuration options, resolve and administer hardware or software problems, etc. Additionally or alternatively, BMC controller 328 may include one or more firmware volumes, each volume having one or more firmware files used by the BIOS' firmware interface to initialize and test components of computing device 300.

Super I/O Controller 326 combines interfaces for a variety of lower bandwidth or low data rate devices. Those devices may include, for example, floppy disks, parallel ports, keyboard and mouse, temperature sensor and fan speed monitoring, etc.

In some cases, computing device 300 may be configured to access different types of computer-accessible media separate from memory 312. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to computing device 300 via northbridge controller 304 and/or southbridge controller 316.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that computing device 300 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 304 may be combined with southbridge controller 316, and/or be at least partially incorporated into CPU(s) 302. In other implementations, one or more of the devices or components shown in FIG. 3 may be absent, or one or more other components may be added. Accordingly, systems and methods described herein may be implemented or executed with other computer system configurations.

One of ordinary skill will recognize that the computer system 300 of FIG. 3 is only one example of a system in which the present embodiments may be utilized. Indeed, the present embodiments may be used in various electronic devices, such as network router devices, televisions, custom telecommunications equipment for special purpose use, etc. The present embodiments are in no way limited to use with the computer system of FIG. 3.

It is noted that any given enterprise or data center may have dozens, hundreds, or even thousands of chassis and each chassis can have up to 32 quarter blades (or more). Each blade server has access to its corresponding Secured SSDs in its corresponding slots. If there is a change in a given blade server's location, whether the blade is moved within the same chassis or to a different chassis, or if there is a change in Secured SSD slot position where that slot belongs to some other blade server, administrators have the tedious job of import the configuration and setting up the server again to access the Secured SSDs. Hence it is difficult to manage a chassis when servers and Secured SSDs locations are changed, for example, for business needs.

In any given chassis a plurality of blade servers may be attached and each blade may have its own dedicated SSD slots, some of which are actually occupied by SSDs. Each blade server also has a BMC which stores a respective key file used to authenticate and securely access the Secured SSDs. As such, problems may arise in a number of scenarios.

In a first problem scenario, a Secured SSD created on one blade server can be migrated to another blade. But a Secured SSD secured with a security key different from the current system key cannot be imported without any authentication of the original passcode used to secure them. In this case, the BMC may read the "key identifier" from the inserted Secured SSD and, if it is not blank, the BMC may then assume that this is a Secured SSD and will look for a match in its key file. If the "key identifier" match is found, then the BMC may send the password using a side-band interface of the Secured SSD. Otherwise, the BMC will treat the Secured SSD as foreign drive. The administrator uses BMC interfaces to execute a "ImportSecuredForeignConfiguration" command which prompts for a passphrase used to secure that Secured SSD. Once the correct passphrase is entered and the importing of the foreign configuration is completed, the administrator may set the "key identifier" and "password" from the key file by executing a "ChangeNVMePCIeSSDSecurityKeY" command.

In a second problem scenario, the location of the blade server may be changed within the same chassis. When location of the blade server is changed to a new blade slot within the Chassis, all Secured SSDs will appear as foreign to it because the key pair was created by a previous blade server. Hence, the administrator would have to perform the same steps outlined above in the first scenario, by this time for every Secured SSD, in order to be able to access them in their new configuration.

In a third problem scenario, a new blade server may be inserted in a chassis whenever any of the blade servers becomes non-functional. Often blade servers may go down in data centers when there is an Operating System (OS) corruption, failure of the system CPU, system memory, hardware failure or any network I/O device, which requires replacement of that blade servers.(new or existing server from same or other chassis). With the new insertion of a new blade server, the new server cannot access the Secured SSDs whose security key was created by a previous server. Accordingly, an administrator may have to use a "CreateSecurityKeyPair" command to create a security key for the new blade server and for each Secured SSD.

In each of the three aforementioned problem scenarios, an administrator must perform intensive, manual work in order to keep the data center functioning properly. To address these problems, systems and methods described herein provide a CMC-based technique to help administrators to configure a server automatically to access Secured SSD s during a change of Server and/or SSD positions by avoiding complex steps which would otherwise have to be performed manually, thus saving administrator time and bandwidth.

In various embodiments, an Intelligent Secure SSD locking/unlocking management algorithm dynamically creates an SSD Key Inventory database in non-volatile memory, updates the database, and manages the locking/unlocking of Secured SSD s whenever new server or Secured SSD is inserted in a slot, or whenever its position or location is changed within a single chassis or across multi-chassis in a group of chassis.

In the embodiments described herein, a CMC may request inventory of Secured SSD locking keys from all BMCs within a given chassis under one or more of the following conditions: when a BMC indicates a change in SSD locking keys via an alert message "Key_change_serverX"; when a server reboots (a host status event may be sent to the CMC); when a BMC reboots and sends a WSMAN_READY event to the CMC; when the CMC reboots (in redundant and non-redundant cases); and/or in the case of a CMC switchover or failover.

The CMC may identify if a particular server blade supports or enabled Intelligent PCIe locking/unlocking feature or not. If a particular blade supports PCIe locking/unlocking, the CMC may make a Web Services-Management (WS-MAN) request for PCIe SSD keys and the BMC responds with same within specified timeout period (e.g., 60 seconds). The CMC can then interact with a WSMAN client library to request inventory of PCIe SSD locking keys from the BMC. Additionally or alternatively, the CMC may also use Intelligent Platform Management Interface (IPMI) commands to retrieve PCIe Keys from the BMC.

The CMC may store the collected SSD locking keys in non-volatile memory and it may update this database along with blade serial number and corresponding SSD serial numbers or other identifier(s). After then initial set up, a blueprint database of all servers and corresponding Secured SSD serial numbers with slot information is created. This database table may be updated whenever there is a change in position/location of blades and Secured SSD in a chassis or a group of chassis. An example of such a database is illustrated in Table I below:

TABLE I

| SSD Key Inventory | | | | | | | | | | |
|---|---|---|---|---|---|---|---|---|---|---|
| Server Slot | Server ID | SSD Slot | | | | SSD ID | | | | Key Pair |
| 1 | $SNOXX_1$ | 1 | 2 | 3 | 4 | $Tag_1$ | $Tag_2$ | $Tag_3$ | $Tag_4$ | Key Pairs$_1$ |
| 2 | $SNOXX_2$ | 1 | 2 | 3 | 4 | $Tag_1$ | $Tag_2$ | $Tag_3$ | $Tag_4$ | Key Pairs$_2$ |
| 2 | $SNOXX_3$ | 1 | 2 | 3 | 4 | $Tag_1$ | $Tag_2$ | $Tag_3$ | $Tag_4$ | Key Pairs$_3$ |
| ... | ... | ... | | | | ... | | | | ... |
| 64 | $SNOXX_{64}$ | 1 | 2 | 3 | 4 | $Tag_1$ | $Tag_2$ | $Tag_3$ | $Tag_4$ | Key Pairs$_{64}$ |

Examples of server IDs and SSD IDs may include their respective serial numbers. Also, in some implementations, another column may be added to Table I indicating a chassis ID for all servers in that same chassis; which is particularly useful for certain group management techniques described further below.

Figure 4:
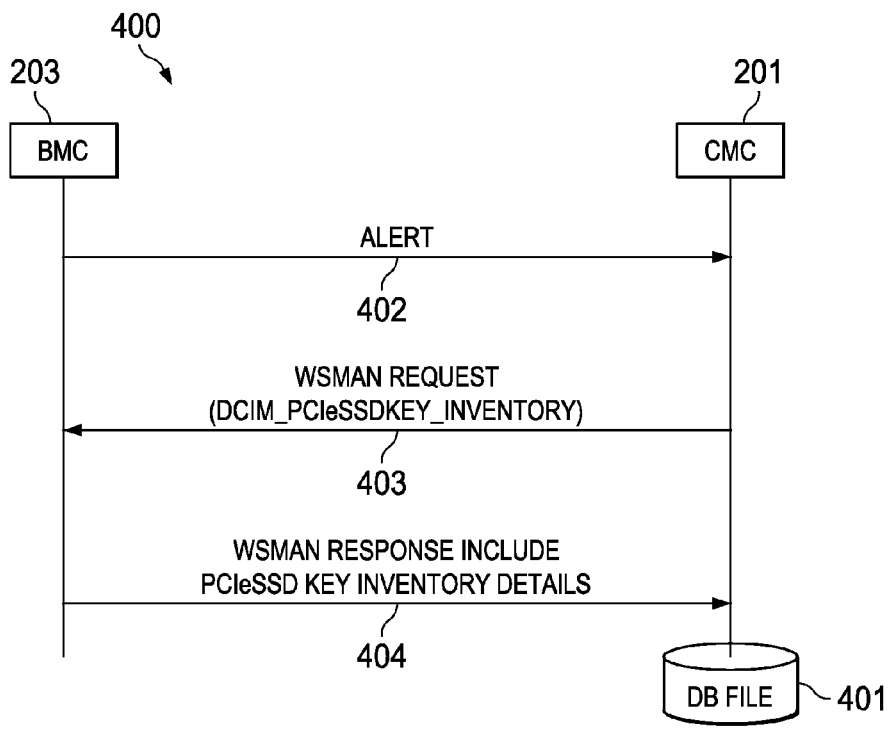

FIG. 4 is a diagram showing an example of messages 400 exchanged between a BMC and a CMC for managing secured devices according to some embodiments. First, in response to a triggering event, BMC 203 transmits an alert 402 to CMC 201. Then, CMC 201 transmits an WSMAN request 403 (e.g., "DCIM_PCIeSSDKey_Inventory") to BMC 203. Finally, BMC 203 sends a WSMAN response including PCIeSSD key inventory details 404 to CMC 201, which uses those details to create database file 401.

In some cases, response 404 may include, for each Secured SSD: an IHS identification, a slot identification, an SSD identification, and a security key pair. Moreover, response 404 may be provided to CMC 201 within a timeout period from request 403. Using these systems and methods, the first, second, and third problem scenarios mentioned above may be addressed as follows:

In the first problem scenario, a Secured SSD has its position changed within a chassis. For instance, assume a Secured SSD of Server 1 is now connected to Server 2. The moved Secured SSD is foreign to Server 2, which has to import the configuration with a valid authentication before accessing it. To that end, the BMC of Server 2 reads the "KeyIdentifier" from the Secured SSD Key Identifier field, and sends this information to the CMC database. The CMC then checks the "KeyIdentifier" against the database, fetches the corresponding passphrase—the security key pair of Server Slot 1—and sends that information back to the BMC.

The BMC unlocks the Secured SSD and imports the foreign configuration. The BMC applies the new security key pair to the Secured SSD, which is associated with Server 2. The BMC then sends the updated Secured SSD information to the CMC and the database is updated accordingly with the new information—that is, Secured SSD Slot and Security key pair information is updated for Server Slots 1 and 2 in the database.

In the second problem scenario, server 1 is changed from slot 1 to some empty server slot (slot 5) and corresponding Secured SSD are also moved along with it. Accordingly, the BMC will alert the CMC that there is a change in its slot position. The CMC will then update the database accordingly with the all of the above information—in the database, server slot 5 has all the information that was originally associated with server slot 1.

And in the third problem scenario, both a Secured SSD and server position are changed. In this case, the CMC handshakes with the BMC to update the database with the latest information. Built-in logic in the CMC gives all the information to the BMC to access the Secured SSD attached to it, similarly as in the first scenario.

In some situations, a fourth problem scenario may arise where a Secured SSD or blade server is inserted from some other chassis with in a group of chassis. In this case, the CMC enables a user to monitor multiple chassis from a single lead chassis. When a chassis group is enabled, quick launch links are available to open web pages for member chassis or servers. For example, a server and I/O inventory may be available for a group. A selectable option is available to synchronize a new member's properties to the leader's properties when the new member is added to the group.

FIG. 5 is block diagram of an example of a system configured for managing secured storage devices across a plurality of chassis using a group manager feature according to some embodiments. Lead chassis 100A is in communication with member chassis 100B-N, each of which includes its own CMC, server blades, BMCs, and associated SSDs. In some implementations, group of CMCs 500 is connected to each other under same local network.

Each member CMC 100B-N may have a local database (LDB) 401B-N of its own along with another local database (not shown) similar to 401B-N, but for all remaining member CMCs. Lead CMC 100A has a master database (MDB) 501 which contains all the LDB information of all its member CMCs. If there is any change in the position of any Secured SSD or Blade Server, a corresponding BMC sends the information to its local CMC. Logic built into the local CMC will search first in its own LDB.

If the information is available in that LBD, then the local CMC may follows the operations mentioned in first problem scenario. Otherwise, the local CMC (or the CMC of lead chassis 100A), will search the information in other LDBs. Once the CMC finds the security key pair information from one of the DBs, it sends the security key pair information to the BMC and again follows the operations mentioned in the first problem scenario.

The LDB is updated with the latest information of Secured SSDs/Servers. This updated information is also sent to the CMC of the lead chassis 100A to update MDB 501. The master CMC of lead chassis 100A may then signal all other remaining slave CMCs 100B-N to update their respective LDBs information with the latest information.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A Baseboard Management Controller (BMC) of an Information Handing System (IHS) within a multi-IHS chassis, the IHS having secured Solid State Drives (SSDs) coupled to SSD slots on the IHS, the BMC having program instructions stored thereon that, upon execution, cause the BMC to:
   identify a triggering event in the IHS;
   send an alert to a Chassis Management Controller (CMC) of the multi-IHS chassis;
   receive, from the CMC, a request for a security key pair usable to authenticate a selected one of the secured SSDs in another configuration different from a current configuration; and
   provide a response to the CMC, wherein the CMC is configured to store a key inventory table, wherein each row of the key inventory table includes: (a) an IHS slot number, (b) an IHS identification, (c) a list of SSD slots, (d) an SSD identification for each secured SSD inserted in the SSD slots, and (e) one or more security key pairs.

2. The BMC of claim 1, wherein the triggering event includes a change in locking keys for the at least one secured SSD.

3. The BMC of claim 1, wherein the triggering event includes an IHS reboot.

4. The BMC of claim 1, wherein the triggering event includes a BMC reboot.

5. The BMC of claim 1, wherein the request includes a Web Services-Management (WSMAN) request, and wherein the response includes a WSMAN response.

6. The BMC of claim 1, wherein the request includes a timeout value.

7. The BMC of claim 1, wherein in the current configuration the selected secured SSD is installed in a given SSD slot of the IHS, and wherein in the other configuration the selected secured SSD is installed in a different SSD slot of the IHS.

8. The BMC of claim 1, wherein in the current configuration the selected secured SSD is installed in the IHS, and wherein in the other configuration the selected secured SSD is installed in a different IHS within the multi-IHS chassis.

9. The BMC of claim 1, wherein in the current configuration the selected secured SSD is installed in the IHS, and wherein in the other configuration the IHS is installed in a different multi-IHS chassis.

10. The BMC of claim 1, wherein in the current configuration the selected secured SSD is installed in the IHS, and wherein in the other configuration the selected secured SSD is installed in a different IHS of a different multi-IHS chassis.

11. A Chassis Management Controller (CMC) of a multi-Information Handling System (IHS) chassis, the multi-IHS chassis having IHSs coupled thereto, each of the IHSs having secured Solid State Drives (SSDs) coupled to SSD slots on the IHS, and the CMC having program instructions stored thereon that, upon execution, cause the CMC to:
   transmit to a Baseboard Management Controller (BMC) of a selected one of the IHSs, a request for a security key pair usable to authenticate a selected SSD in another configuration different from a current configuration;
   receive a response from the BMC; and
   store a received security key pair in a key inventory table, wherein each row of the key inventory table includes: (a) an IHS slot number, (b) an IHS identification, (c) a list of SSD slots, (d) an SSD identification for each secured SSD inserted in the SSD slots, and (e) one or more security key pairs.

12. The CMC of claim 11, wherein the request is transmitted in response to a triggering event detected by the BMC, and wherein the triggering event includes a change in locking keys for the at least one secured SSD or a BMC reboot.

13. The CMC of claim 11, wherein the request is transmitted in response to a CMC reboot or switchover operation.

14. The CMC of claim 11, wherein: (a) in the current configuration the selected secured SSD is installed in a given SSD slot of the selected IHS, and in the other configuration the selected secured SSD is installed in a different SSD slot of the selected IHS; (b) in the current configuration the selected secured SSD is installed in the selected IHS, and in the other configuration the selected secured SSD is installed in a different IHS; (c) in the current configuration the selected secured SSD is installed in the selected IHS, and in the other configuration the selected IHS is installed in a different multi-IHS chassis; or (d) in the current configuration the selected secured SSD is installed in a given IHS slot of the multi-IHS chassis, and in the other configuration the selected secured SSD is installed in a different IHS slot of a different multi-IHS chassis.

15. In a multi-Information Handling System (IHS) chassis having IHSs coupled thereto, each of the IHSs having secured Solid State Drives (SSDs) coupled to SSD slots on the IHS, a method comprising:

transmitting, from a Chassis Management Controller (CMC) of the multi-IHS chassis to a plurality of Baseboard Management Controllers (BMCs) of a plurality of IHSs coupled to the multi-IHS chassis, a request for a security key pair usable to authenticate a secured SSDs in a configuration different from a current configuration;

receiving responses from the plurality of BMCs; and creating a database of security key pairs for a plurality of SSDs installed in a plurality of blades across a plurality of chassis, wherein each row of the database includes: (a) an IHS slot number, (b) an IHS identification, (c) a list of SSD slots, (d) an SSD identification for each secured SSD inserted in the SSD slots, and (e) one or more security key pairs.

16. The method of claim 15, further comprising:

receiving a notification from a given BMC that a given secured SSD has been installed into a given slot of a given blade of a given one of the plurality of chassis; and in response to determining that the given secured SSD has a security key pair stored in the database, providing at least a portion of the security key pair to the given BMC sufficient for the given BMC to authenticate the given secured SSD.

* * * * *